Jan. 12, 1943. G. V. HOLLOMAN ET AL 2,307,781
CONTROL FOR TARGET BOATS OR OTHER VEHICLES
Filed Aug. 17, 1940 6 Sheets-Sheet 2

INVENTORS
GEORGE V. HOLLOMAN
RAYMOND K. STOUT
CHARLES L. PAULUS
BY
ATTORNEYS

Jan. 12, 1943.     G. V. HOLLOMAN ET AL     2,307,781
CONTROL FOR TARGET BOATS OR OTHER VEHICLES
Filed Aug. 17, 1940     6 Sheets-Sheet 3

INVENTORS
GEORGE V. HOLLOMAN
RAYMOND K. STOUT
CHARLES L. PAULUS
BY
ATTORNEYS

Jan. 12, 1943.  G. V. HOLLOMAN ET AL  2,307,781
CONTROL FOR TARGET BOATS OR OTHER VEHICLES
Filed Aug. 17, 1940  6 Sheets-Sheet 6

FIG. 9.

INVENTORS
GEORGE V. HOLLOMAN
RAYMOND K. STOUT
CHARLES L. PAULUS
BY
ATTORNEYS

Patented Jan. 12, 1943

2,307,781

UNITED STATES PATENT OFFICE 2,307,781

CONTROL FOR TARGET BOATS OR OTHER VEHICLES

George V. Holloman, Charles L. Paulus, and Raymond K. Stout, Dayton, Ohio

Application August 17, 1940, Serial No. 353,056

15 Claims. (Cl. 114—144)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a radio control system for vehicles and more particularly relates to a novel control system for a boat used as a target in aircraft bombing practice and remotely controlled by radio signals transmitted from an airplane, which directs the course of the boat.

The broad idea of controlling boats or other vehicles by radio is old in the art and the method of transforming the radio signals into vehicle controlling forces, employed in the present invention, is an improved form of the system disclosed in United States Patent No. 1,522,883, granted to John Hays Hammond, Jr.

The system broadly comprises a radio transmitter capable of transmitting a carrier wave which can be modulated at one or more audio frequencies, located at some point remote from the vehicle to be controlled. The vehicle to be controlled is equipped with a radio receiver tuned to the carrier wave frequency and whose output is fed into a plurality of tuned filter circuits, each of which is responsive to a particular audio frequency and each of which circuits is operative to actuate a relay, which in turn is operative to control servo mechanism to carry out various vehicle control functions such as steering and engine throttle control.

One of the features of the present invention is, in addition to a radio control system of the type above described, of a local independent control of the various servo mechanisms, as well as a manual control system. This feature is very desirable particularly in connection with a target boat, since the boat may be manually navigated away from the dock to the site of the bombing practice and then placed under control of the local control system, which will then indicate whether all of the servo control units are in proper working condition. While the boat is being tested under the local control system, a separate test can be made of the radio system by means of a local test oscillator and by signals received from the control airplane. By these tests it can be ascertained whether the radio receiver, including the control relays, is in working order, as well as the operativeness of all of the controlled apparatus from the radio relays to and inclusive of the servo control devices. Upon completion of all testing, the boat may be placed under radio control and the occupants may leave the boat until the bombing practice is completed.

A further novel feature of the invention is the cooperation between the engine throttle control, power transmission clutch and rudder control systems, such that when the boat is under radio control and no radio control signal is being received, the engine throttle will be closed to the idle position, the engine will be simultaneously declutched from the propeller shaft and the rudder will be placed in the straight ahead position, thus causing the boat to stop until a further radio command is received.

A further novel feature of the invention is the interconnection between an electric servomotor throttle control and a manual throttle control by means of a friction coupling, such that the operation of the manual control actuates the engine throttle independent of the servomotor, but actuates the servomotor follow-up control into the position corresponding to the instant throttle setting, so that upon transfer of the control of the throttle from the manual means to the power means no interference will be experienced.

The principal object of the invention is the provision in a remote controlled vehicle such as a boat or the like, of servo means for controlling the speed and direction of the vehicle, radio signal responsive means for controlling the servo means, local means for controlling the servo means independently of said ratio signal responsive means and manual control means for controlling the vehicle independent of said servo means.

A further object of the invention is the provision in a radio controlled vehicle, of means to control the vehicle speed, means to control the direction of vehicle travel, and clutch means operable to disconnect the supply of power to the vehicle driving means, each of said means being under the control of a radio signal responsive means; and means operative upon the cessation of radio control signals to move the speed and directional control means into predetermined positions and simultaneously to actuate the clutch to disengage the vehicle driving means.

Another object of the invention is the provision in apparatus of the character described, of an engine, a throttle control for the engine, an electric servomotor for positioning the throttle in selected predetermined positions, a follow-up device operative to stop the motor upon the throttle control attaining the selected position, and a manual control means for actuating the said throttle control and interconnected to the follow-up device so that either type of control may be employed selectively without interference of the one type of control with the other.

Other objects of the invention not specifically enumerated above will become apparent by reference to the specification and the appended drawings in which:

Figure 1:
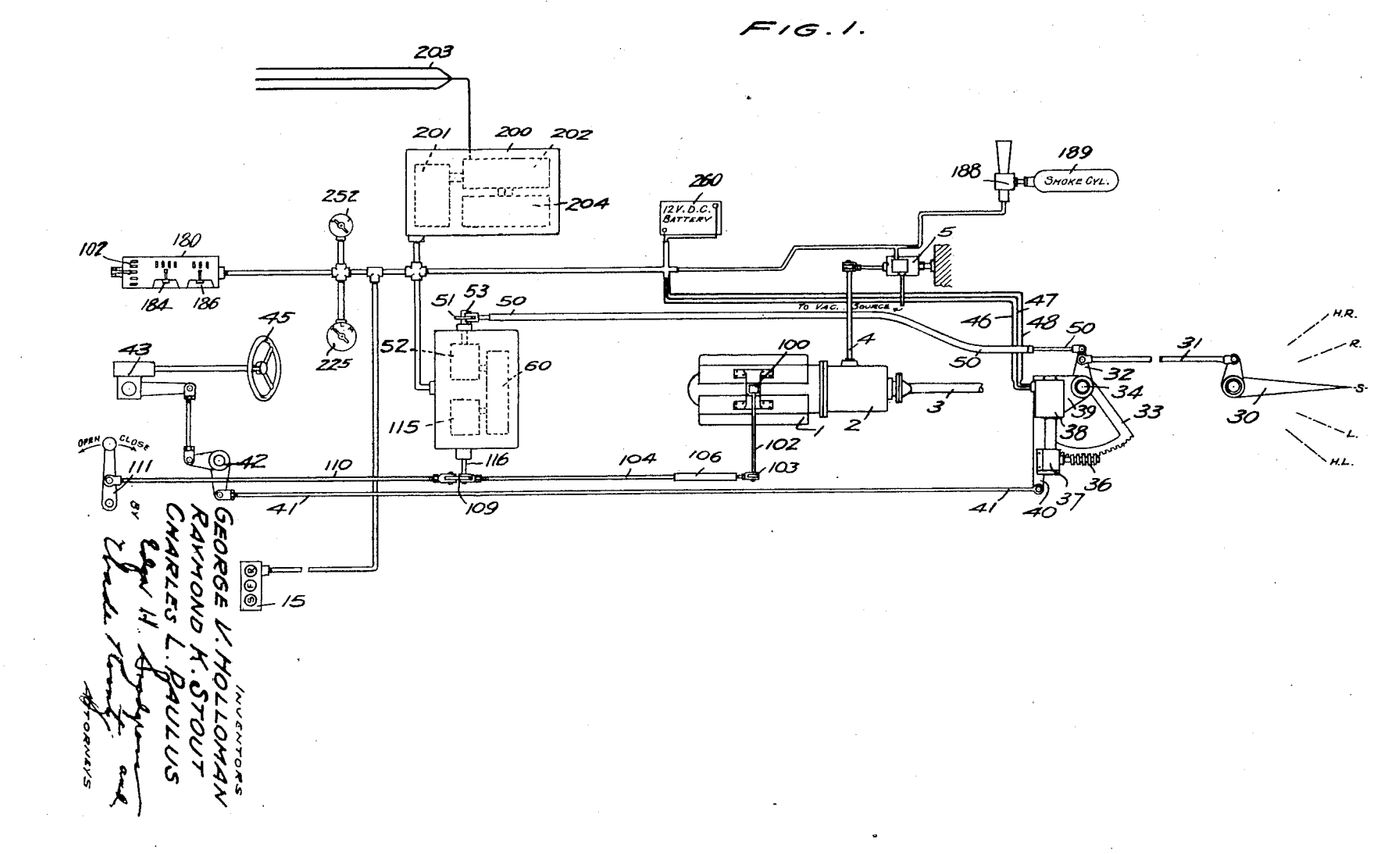
Figure 1 is a schematic representation of the various elements of the radio, local and manual control systems for vehicles in accordance with the invention.

Referring now to Figure 1, the reference numeral 1 generally indicates a conventional internal combustion engine serving as the power plant for a boat and equipped with the usual double clutch controlled gear transmission 2 for driving the propeller shaft 3. The transmission is of such a type that when the clutch is shifted in one position, the boat is driven in a forward direction, when in a second position, the boat is driven astern, and when in a third or neutral position intermediate the first two named positions, the engine 1 is disconnected from driving relation with the propeller shaft 3. The transmission clutches are controlled by a control shaft 4 actuated by an electric solenoid controlled vacuum servomotor generally indicated by the reference numeral 5 and of a well-known construction. The piston of the vacuum clutch actuator servomotor 5 is movable into three positions corresponding to the clutch positions above enumerated. The servomotor 5 is adapted to be controlled by a manually actuated electric push-button control generally indicated by the reference numeral 15, or controlled by a cam cooperating with the engine throttle control means in a manner to be later described in detail.

The reference numeral 30 indicates the steering rudder of the boat which is actuated by a link 31, pivotally connected to an arm 32, formed as an integral part of a gear sector 33. The gear sector 33 is rotatably mounted on a stationary spindle 34 and has gear teeth 35 meshing with a worm 36, driven by a reduction gear unit 37, which in turn is driven by a reversible split field direct current motor 38. The worm, reduction gear and motor are each supported from a plate 39, freely rotatably mounted on the stationary spindle 34. The plate 39 is provided with an extension arm 40, pivotally connected to the push-pull control rod 41. The rod 41 at its other end is pivotally connected to a bell crank 42, which in turn is operatively connected to a conventional steering mechanism 43 manually operated by the steering wheel 45. The worm 36 forms an irreversible driving connection to the gear sector 33, so that by rotation of the steering wheel 45, the link 41 will rotate the arm 40 and mounting plate 39 about the spindle 34. Rotation of the plate 39 causes rotation of the gear sector 33 and arm 32 due to the above noted irreversible worm drive, thus causing arm 31 to manually actuate the rudder 30.

When it is desired to actuate the rudder by local or by remote control, as distinguished from manual control, the manual steering mechanism elements 42—43 are locked by means (not shown) into the neutral or straight position and power is supplied to the motor armature conductor 46 and one of the field conductors 47, or 48, to energize the electric servomotor 38 to run in the desired direction. Rotation of the shaft of motor 38 causes worm 36 to drive gear 33, which through arm 32 and link 31 positions the rudder 30 in a selected one of a number of predetermined positions, indicated in Figure 1 as S (straight), CR (cruise right), HR (hard right), CL (cruise left) and HL (hard left). The energizing of motor 38 is selectively under the control of local electric control or radio control and the motor 38 is de-energized upon the rudder attaining the selected position by means of a follow-up push-pull control 50, pivotally connected at one end to the arm 32 and connected at the other end to a crank arm 51, mounted on the outer end of a shaft 53, of a cam selector switch control device generally indicated by the reference numeral 52.

The engine 1 is provided with a carburetor 100, having a throttle control shaft 102, actuated by a crank arm 103, which is connected by means of a linkage generally indicated by the reference numeral 104 to a crank arm 109, mounted on a shaft 116 of an electric throttle engine or servomotor generally indicated by the reference numeral 115. The crank arm 109 is also connected by means of a link 110 with a manual throttle control lever 111. The shaft 116 is connected to its driving motor by means of a friction coupling hereinafter described in detail, which permits the shaft 116 to slip relative to the driving electric motor, allowing the throttle to be manually set by means of the control lever 111. The throttle engine 115 is adapted to be controlled locally, or by radio control, to position the engine throttle in a number of predetermined positions corresponding to "idle," "slow forward," "cruising" and "high speed" conditions. The throttle engine or servomotor has associated therewith a number of selector cams which serve to interrupt the supply of current to the electric motor which drives shaft 116, whenever the throttle is in the desired one of the aforesaid predetermined positions. The shaft 116 drives the cams, which are in effect follow-up devices, so that these cams are also rotated when the throttle is manually adjusted, thereby preventing any interference between the manual and power adjustment means. The throttle engine also serves to disengage the clutch of the transmission 2 when the throttle is set in the "idle" position, as will be hereinafter more fully described.

A local control switch generally indicated by the reference numeral 180, is provided with a rudder motor control switch 107 having five positions corresponding to the five predetermined rudder positions and operative through the medium of the selector cam unit 52, to position the rudder in any one of the five predetermined positions. The local control switch 180, is also provided with a manually actuated switch 184, adapted to selectively control the throttle engine 115 to position the throttle in any one of the predetermined positions enumerated above. The local control switch 180, also incorporates a manual switch 186, which is adapted to control a solenoid actuated smoke emitting nozzle 188, supplied with smoke producing chemicals from a tank 189. The smoke emitting device is also adapted to be radio controlled for the purpose of indicating the position of the boat. The smoke emitting system is of a known type and forms no part of the invention claimed herein and hence will not be further described.

The radio control unit generally indicated by the reference numeral 200, comprises a power supply unit 201, utilizing direct current from the boat storage battery, a conventional radio receiver unit 202 and a filter circuit and relay unit 204. The radio receiver 202 is connected to the antenna 203 for receiving the radio control signals emitted from a remote control station. The unit 204, comprises a plurality of tuned filter circuits each responsive to a predetermined audio frequency and connected in parallel with the output of the radio receiver 202. Each of the filter circuits contain a sensitive relay which is effective to control a respective servomotor circuit to initiate a control movement of the boat rudder, engine throttle, or smoke signal devices. The follow-up means associated with the engine throttle and rudder servomotors open the energized power circuit and stop the servomotors in predetermined positions, as above described. Eight filter circuits and associated relays are employed in the radio control system, four for rudder control, three for throttle control and one for controlling the smoke signal device, the latter relay not being illustrated in the drawings. Each of the relays controlling the rudder and engine throttle are respectively operative to cause the rudder and throttle to be set in predetermined positions corresponding to the same positions attained by use of the local control switches 182 and 184 respectively, since the control switches are arranged to act in parallel with the radio relays. By this arrangement it is possible to test all of the control circuits from the relays onward by operating the boat under the local control 180 and by separately testing the radio unit 200 by means of a local oscillator, as well as in conjunction with the remote control station transmitter, positive assurance of satisfactory operation under remote control will be had.

The rudder control system is so arranged that when the boat is under radio control and no radio rudder command signal is being sent, the radio controlled relays associated with the rudder control will together form a circuit which will cause the boat rudder to be positioned in the "straight" position. Also, the engine throttle control system is so arranged, that when no radio throttle command signal is being sent, the radio controlled relays associated with the engine throttle will together form a circuit which will cause the engine throttle to be positioned in the "idle" position and simultaneously will cause actuation of the clutch in transmission 2, to disconnect the engine 1 from the propeller shaft 3 as previously noted.

When under radio control and no rudder or throttle command signal is being received, the rudder will be positioned in the "straight" position and the throttle will be set in the "idle" position, and the engine will be declutched from the propeller shaft. The above noted arrangement eliminates the use of three additional radio controlled relays to control the "straight" position of the rudder, the "idle" setting of the engine throttle and the declutching of the engine from the propeller shaft, respectively.

A four position master switch generally indicated by the reference numeral 225 is employed to selectively cut in the local control switch unit 180, or the radio control unit 200, or to disable certain of the electrical control units to permit manual control of the boat. A further switch having two positions and generally indicated by the reference numeral 252 is employed in association with the power actuated throttle control to give two alternative high speed and cruising speed settings to the engine throttle, so that the speeds may be those corresponding to either a battleship or a fast cruiser. Power for actuating the entire electrical system is derived from a large capacity 12 volt storage battery generally indicated by the reference numeral 260.

The general operation of the target boat control system is as follows:

The master switch 225 is placed in the manual control position rendering certain of the electrical control units inoperative and the manual steering mechanism is unlocked and the boat manually controlled until the bombing practice site is reached. The master switch 225 is then moved to the local control position and the boat is navigated through testing maneuvers by actuation of the rudder control switch 182, and throttle control switch 184, of the local control switch unit 180 and the smoke signal apparatus is also operated by means of switch 186.

While the boat is under local control the radio unit 200 is tested by the use of a test oscillator carried in the boat and also in cooperation with the remote control transmitter mounted in an airplane flying in the vicinity of the bombing practice site, separate radio communication means (not shown) being employed to direct the test. Upon the tests showing that all of the apparatus is in working order, switch 252 is set to either the "cruiser" or "battleship" position and master switch 225 set to the "remote" control position. If no radio command signal is being received, the boat will stop with the engine idling and declutched from the propeller shaft and the rudder will be in the straight ahead position as previously described. The occupants of the boat may then transfer to another craft and leave the boat under radio control. The operator of the transmitter in the control airplane may then modulate the carrier wave of the transmitter at one or more of the audio frequencies to which the filter circuits of the radio control receiver unit 200 are responsive, to thereby effect control of the boat during bombing practice. The target boat may be returned to port by the manual control system at the completion of bombing practice.

The throttle engine and the cam control of the rudder servomotor are very similar in construction, so that the throttle engine will now be described, the description thereof also serving to illustrate the operation of the cam selector unit 52 of the rudder servomotor control.

Figure 2:
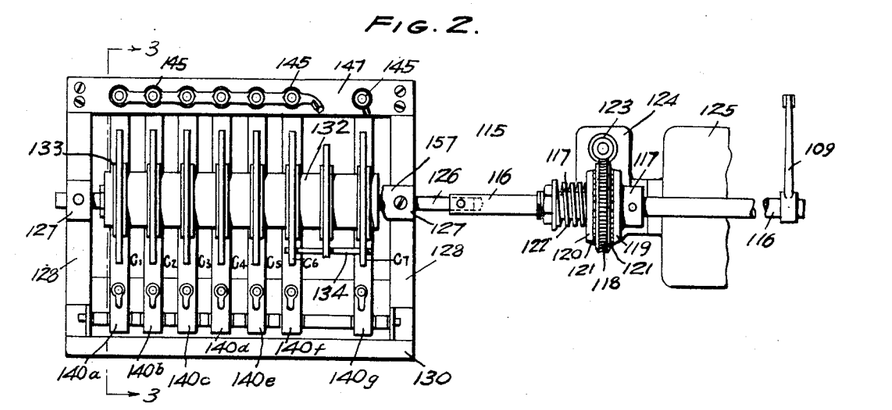
Figure 2 illustrates the electric servomotor or throttle engine used to control the engine throttle including a novel manual control device.
Figure 4:
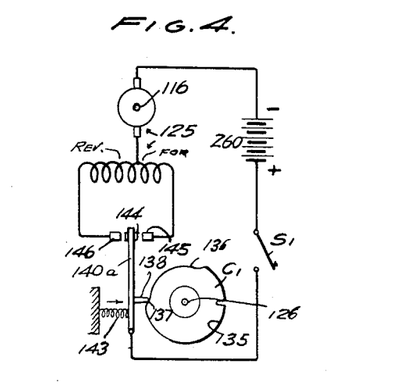
Figure 4 is a diagrammatic illustration of the operation of the cam control of the throttle engine illustrated in Figures 2 and 3.

Referring now to Figure 2, the throttle engine 115, comprises a shaft 116, upon the outer end of which is mounted the crank arm 109 which is adapted to be connected to the throttle control rod 104 and the manual control rod 110 (Figures 1 and 4). The shaft 116 has pinned thereon a sleeve 117, on which is rotatably mounted a worm gear 118. The gear 118 is located between an enlarged disc portion 119 integral with sleeve 117 and an annular disc 120 rotatably mounted on the sleeve 117. The discs 119 and 120 are each faced with friction material 121, which engages the side faces of the gear 118 and frictional engagement with the gear is maintained by means of a compression spring 122. The gear 118 meshes with a worm 123, driven by a speed reduction gear unit 124, in turn driven by the reversible electric motor 125. The electric motor 125 may, through worm 123, gear 118 and the friction discs 119 and 120, drive the sleeve 117 and shaft 116 in either direction to effect a throttle adjustment through crank arm 109. Because of the worm drive being irreversible, if crank arm 109 and shaft 116 are rotated by the manual throttle control the friction discs 119 and 120 can slip relative to the gear 118 allowing relative rotation between the gear 118 and the shaft 116.

At its inner end the shaft 116 is coupled to a shaft 126 which is journalled in supports 127, carried by vertical uprights 128, in turn connected by a base 130. A drum 132 preferably made of fibre or hard rubber is pressed on the shaft 126 and carries thereon a series of circular cams $C_1$, $C_2$, $C_3$-$C_7$ inclusive, each having an enlarged hub portion 133 which frictionally grips the drum 132, but allows the cams to be angularly adjusted relative to the drum 132, the cams $C_6$ and $C_7$ however being held in fixed angular relation with respect to each other by means of a pin 134.

Figure 3:
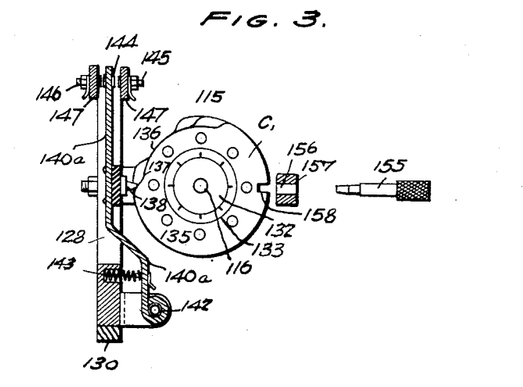
Figure 3 is a sectional view taken along line 3—3 of Figure 2.

Referring to Figure 3 each cam $C_1$, etc., is formed with a raised arcuate portion 135 and a depressed arcuate portion 136, the portions 135 and 136 being joined by a sloping neutral section 137. Each cam cooperates with a cam follower 138 mounted on a spring contact arm $140a$, $140b$—$140g$. The spring contact arms are pivotally supported at their lower ends as at 142 and are urged by springs 143, so that their associated cam followers engage the associated cams. At their upper ends, the spring contact arms $140a$, etc., each carry a double contact 144, arranged in spaced relation between a front contact 145 and a rear contact 146, each contact being mounted on a cross member 147 of insulating material. The front contacts 145, with the exception of the contact associated with cam $C_7$, being electrically connected in parallel and similarly all of the rear contacts 146, with the exception of the contact associated with cam $C_7$, being electrically connected in parallel. When a respective cam follower 138 is in contact with the raised portion of its associated cam, the contact 144 is in engagement with the back contact 146, with the follower 138 in contact with the depressed portion 136 of a respective cam, the contact 144 will be in engagement with the associated front contact 145 and with the follower 138 in contact with the neutral portion 137 of a respective cam, the contact 144 is out of engagement with either of contacts 145 and 146. Each of the cams is so set with respect to shaft 116 that the neutral sections 137 are in contact with the associated cam followers in certain predetermined positions of shaft 116 and this setting is obtained by inserting a locking pin 155 through one of a series of holes 156 in a cross member 157 secured to the journal supports 127. The shaft 116 is then rotated until the pin can be inserted in a locking slot 158 cut in each respective cam and located diametrically opposite the neutral section 137 of the cam. The shaft 116 may then be rotated manually or by power means until the shaft is in a position corresponding to the desired throttle setting and the locking pin removed. The remaining cams are then adjusted in a similar manner.

The cam $C_1$ controls the adjustment of the throttle to the "slow" speed ahead position, cams $C_2$ and $C_3$ control the "battleship" and "cruiser" "cruising" speed positions, respectively, cams $C_4$ and $C_5$ control the "battleship" and "cruiser" "high" speed positions, respectively, cam $C_6$ controls the "idle" speed setting of the throttle and cam $C_7$ controls the actuation of the clutch servomotor 5, Figure 1, in cooperation with the cam $C_6$. The particular order of arrangement of the cams on the drum 132 is immaterial and is made to best suit electrical wiring requirements.

The operation of the cams $C_1$, $C_2$, etc., in controlling the throttle servomotor can best be understood by reference to the schematic diagram of Figure 4 in which the spring contact arm $140a$ is shown connected to the positive terminal of the battery 260 in series with a switch $S_1$. The front and rear contacts 145 and 146 are each respectively connected to the forward and reverse windings of the split field of motor 125 and the armature terminal of the motor is connected to the negative terminal of the battery. If the switch $S_1$ is closed with the parts in the position shown, the motor 125 will not be energized, since contact 144 is in the neutral position due to cam follower contacting the neutral section 137 of cam $C_1$. If, however, the cam follower 138 is in contact with the low portion 136 of cam $C_1$, contact 144 will be in engagement with contact 145 and upon closing switch $S_1$, current will flow through the forward winding of the field of motor 125, causing shaft 116 of the motor to rotate in a clockwise direction and simultaneously driving cam $C_1$ in the same direction through shaft 126. The motor 125 will continue to rotate until cam follower 138 engages the neutral section 137, causing the contacts 144 and 145 to separate and deenergize the motor 125. Similarly, if the cam $C_1$ is in such a position that cam follower 138 is in contact with the high portion 135 of the cam, contacts 144 and 146 will be engaged and upon closing switch $S_1$, current will flow through the reverve field winding of motor 125 causing counterclockwise rotation of shaft 116 and cam $C_1$, until the neutral section 137 is again in contact with the follower 138, causing opening of the electrical circuit through motor 125. The range of movement of cam $C_1$, shaft 126 and shaft 116 is approximately 150 degrees and within this range no matter what the position of cam $C_1$ relative to the follower 138, upon closing switch $S_1$, the motor will rotate in such a direction as to place shafts 116 and 126 in the predetermined position determined by the neutral cam section 137.

In the device of Figures 2 and 3, the contacts 145 and 146, except as above noted, may be respectively connected to the forward and reverse windings of the motor 125, or preferably connected to power relays which control the flow of current to these windings, while each of the contact arms $140a$ to $140f$ inclusive, are respectively connected to the battery 260, through suitable selector control switches. The arrangement is then such that each cam and selector control switch is operative to cause the motor 125 to position the shaft 116 in a predetermined position, in the same manner as above described with reference to Figure 4.

In the device of Figures 2 and 3, the cam $C_6$ has its neutral section in such a position that the throttle engine moves the throttle to the "idle" position before cam $C_6$ stops the motor 125 and a yielding connection in the throttle linkage permits the shaft 116 to overtravel the "idle" position, causing the cam $C_7$ to move the contact arm 140g associated therewith to bring the associated contacts 144 and 146 into engagement. The contact 144 is connected to the positive side of the battery and current is then conducted through contact 146 to a solenoid valve of the clutch actuating motor 5 of Figure 1, to cause the clutch to move to the stop position, declutching the engine from the propeller shaft. The cam $C_7$ is made with a neutral section of sufficient width, that the cam must be moved in the throttle opening direction past the "idle" position of the throttle, before contacts 144 and 145 engage to conduct current to the clutch actuating motor 5, to cause the same to engage the forward drive clutch element, so that the clutch will only be engaged for forward drive when the throttle engine is energized to move the throttle to the "slow" ahead position, thus providing against stalling the engine.

Figure 5:
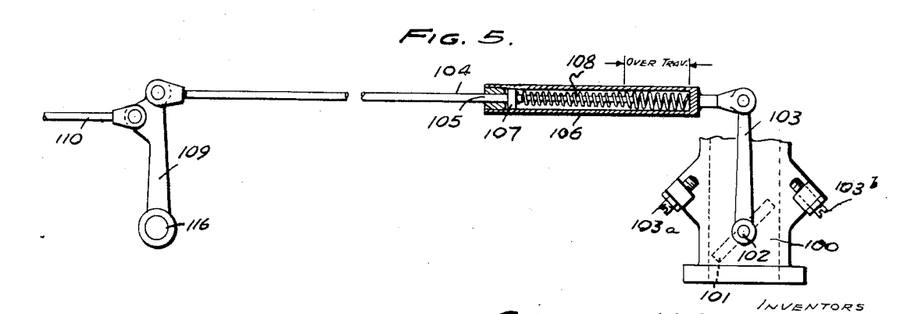
Figure 5 is a view partly in section illustrating a yielding connection in the throttle control linkage.

The yielding connection in the throttle linkage above noted is illustrated in Figure 5 and the linkage generally indicated by the numeral 104, comprises a rod 105 pivotally connected at one end to the throttle engine crank arm 109 and at its other end extending within a hollow tubular member 106 and provided with an enlarged head 107, which engages a compression spring 108 seated within the tubular member 106. The tubular member 106 is pivotally connected at its outer end to the throttle control lever 103, which through shaft 102 actuates the throttle valve 101 of the engine carburetor 100. The compressive stress of spring 108 is normally sufficient to allow the throttle valve to be adjusted without deflecting the spring, but when the throttle control arm 103 strikes the idle stop 103b, further movement of the rod 105 causes the spring 108 to deflect an amount sufficient to provide the overtravel necessary for proper actuation of cam $C_7$, as above noted.

The selector cam device 52 of the rudder control system (Figure 1) is constructed and operates in a manner similar to the cam elements of the throttle engine 115 above described and the only difference being that the follow-up motion is imparted to the cams as a function of the rudder displacement by push-pull control 50 (Figure 1), rather than by a direct geared connection to the rudder actuating servomotor 38 (Figure 1), and no detailed description of the cam selector mechanism 52, is deemed necessary.

Figure 6:
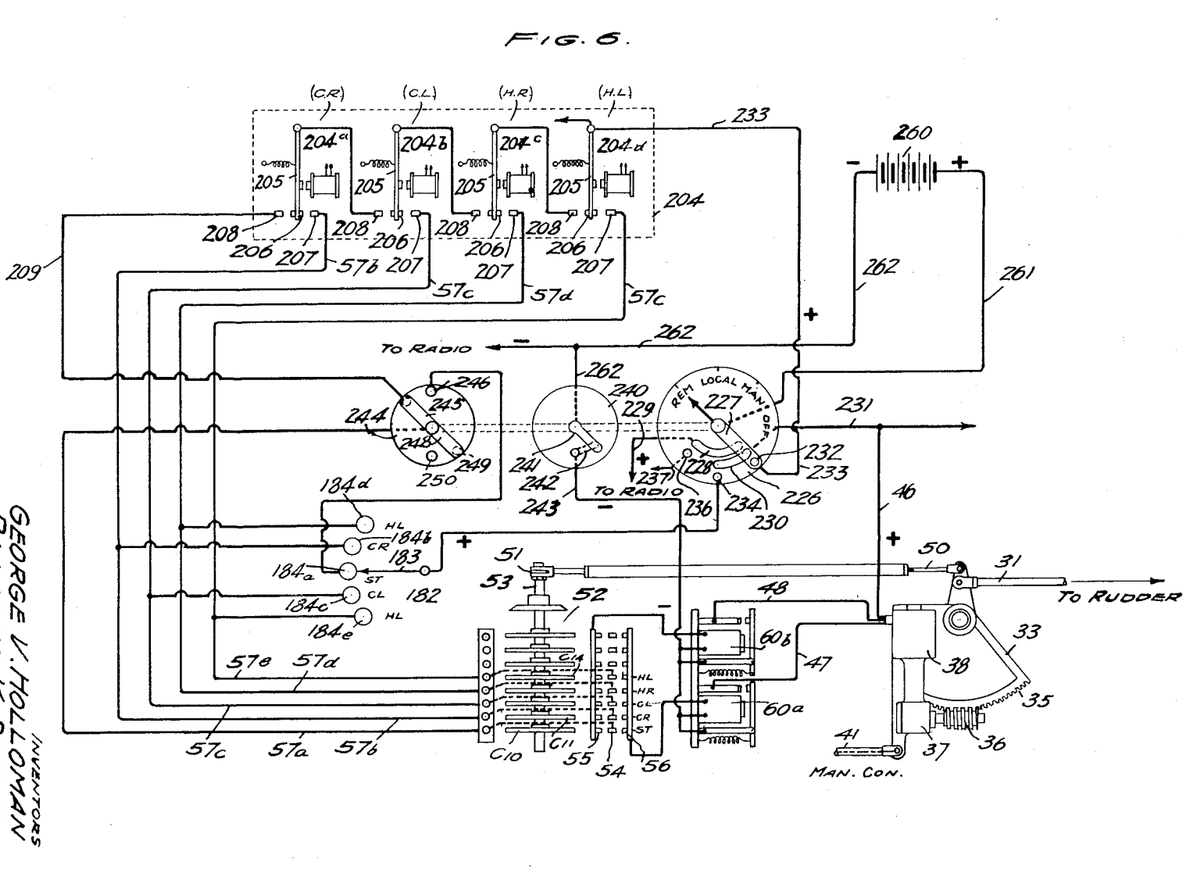
Figure 6 is a schematic view illustrating the rudder control system for the radio controlled boat.
Figure 7:
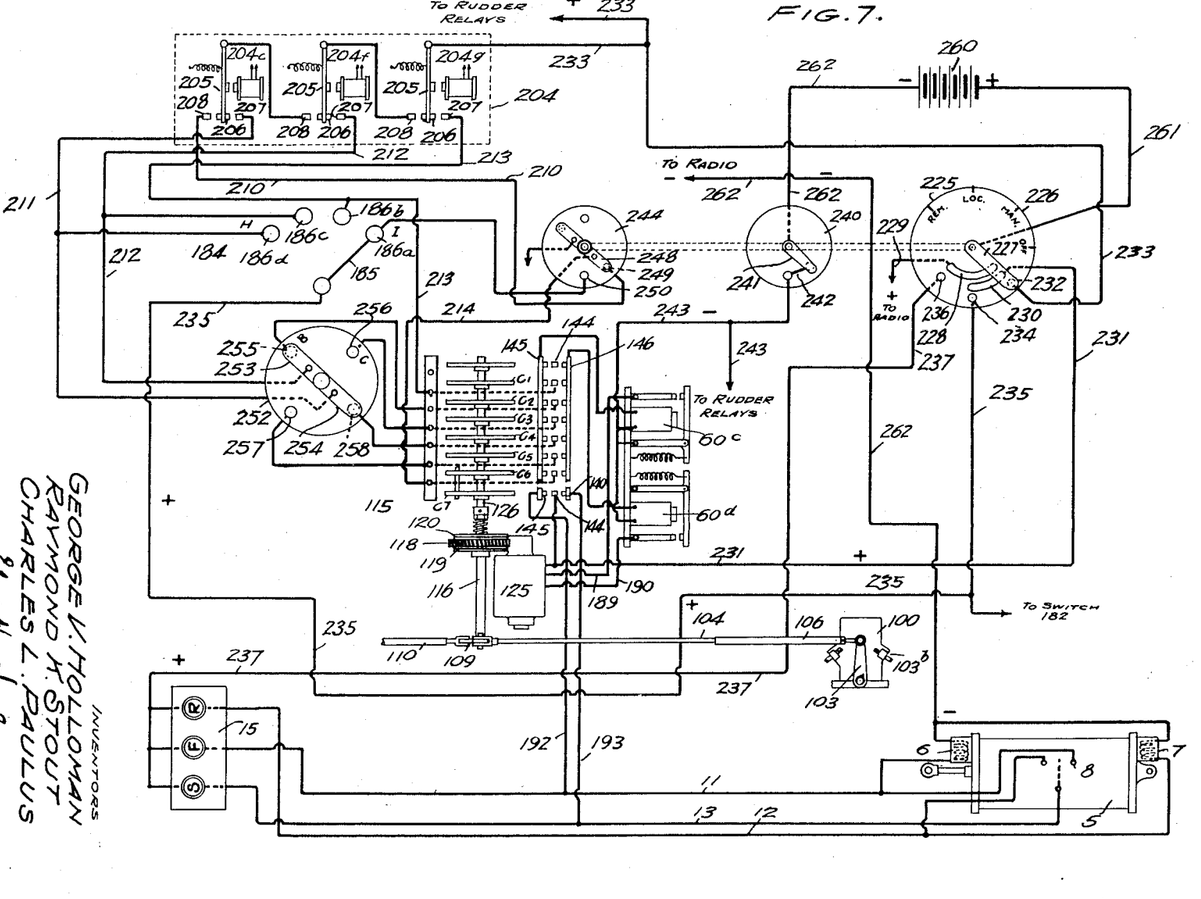
Figure 7 is a schematic view illustrating the novel engine throttle and clutch control system.

A detailed description of the rudder and throttle control systems, as illustrated in Figures 6 and 7, will now be given and throughout the figures electrical conductors and other elements common to both systems are given the same reference numerals. While the electrical system for controlling the rudder is illustrated separately from the engine throttle and clutch operating system, the two systems are electrically interconnected in a manner obvious by inspection of Figures 6 and 7, so that each system is capable of simultaneous operation with the other system.

Referring now to Figure 6 which illustrates the rudder control system, as previously described with reference to Figure 1, the electric servomotor 38 is adapted to position the boat steering rudder in various predetermined positions under the control of a cam selector unit 52. This cam unit has cams $C_{10}$ to $C_{14}$ inclusive, adjustably frictionally mounted on the shaft 53 and operatively connected through the push-pull control 50 to the rudder control arm 32, to interrupt the supply of power to the rudder servomotor 38, upon the rudder attaining certain predetermined positions. Each of the cams $C_{10}$, etc., has associated therewith a central contact 54, mounted on a contact arm (not shown) and adapted to be moved into engagement with either a front contact 55, or a back contact 56, or remain in a neutral position, in the same manner as previously described with reference to the throttle engine, Figures 2 to 4 inclusive. The front contacts 55 are connected in parallel through a power relay 60b of the relay unit 60 (Figure 1) to control the flow of current through field conductor 46 of motor 38; the back contacts 56 being similarly connected in parallel through power relay 60a to control the flow of current through the other split field conductor 47 of the motor 38. Conductors 57a to 57e respectively, connect to the contacts 54 associated with cams $C_{10}$ to $C_{14}$ inclusive, respectively. The cam $C_{10}$ controls the "straight" (S) position of the rudder, cam $C_{11}$, determines the "cruise right" (CR) position of the rudder, cam $C_{12}$ controls the "cruise left" (CL) position of the rudder, cam $C_{13}$ controls the "hard right" (HR) position of the rudder and cam $C_{14}$ controls the "hard left" (HL) position of the rudder.

The relay and filter circuit unit 204 of the radio control unit 200 (Figure 1) has four sensitive relays 204a to 204d inclusive, the relay coils of which are respectively associated with a particular tuned filter circuit (not shown). Each of the relays in addition to the relay coils includes a relay armature arm 205 having a double contact 206 mounted thereon and arranged in spaced relation with a front contact 207 and a back contact 208. The relay arms are urged by springs so that the contacts 206 and 208 are normally engaged when the relay is deenergized. The back contacts 208 of all of the relays except 204a, are serially connected to the relay arm 205 of the next preceding relay such that when no relay is energized a complete circuit is formed from relay arm 205 of relay 204d, to back contact 208 of relay 204a. Similarly, current may flow to any of the relay arms 205 through the preceding relay arms and back contacts. The front contacts 207 of relays 204a to 204d inclusive are respectively connected to conductors 57b, 57c, 57d and 57e, which conductors are also respectively connected to switch points or contacts 184b, 184c, 184d and 184e of the local control switch 182.

A master switch 225 is provided, having three separate switch units 226, 240 and 244 all actuated by a common shaft as indicated in dotted lines and movable into four positions indicated as "remote" "local" and "manual" control positions and an "off" position. The switch 226 includes a switch blade 227 connected to the positive side of the battery 260 by means of conductor 261 and a contact strip 228 connected to a conductor 229 which is adapted to be connected to the positive terminal of the radio unit power supply unit 201 (Figure 1), the blade and contact strip being in electrical contact in all of the switch positions except the "off" position. The switch blade 227 also engages in the "remote" and "local" positions, a contact strip 230, connected in turn to a conductor 231, which, among other things, is adapted to conduct current to the armature conductor 46 of servomotor 38. The switch blade 227 in the "remote" position may also engage a contact 232, which by means of a conductor 233 conducts current to the relay arm 205 of relay 204d. In the "local" position, switch arm 227 also may engage a contact 234 to conduct current through conductor 235 to the switch arm 183 of the local control switch 182. In the "manual" position, the switch blade 227 may engage a contact 236, which through a conductor 237 may supply current to the clutch push button control switch 15, of Figure 1 (see Fig. 7). The negative terminal of the battery 260 is connected among other things by means of a plural branch conductor 262, to the negative terminal of the radio power supply and to the switch arm 241 of the switch 240, forming part of master switch 225 as previously noted. The switch arm 241 is adapted to engage with either of two serially connected contacts 242 in the "remote" and "local" positions of the switch arm, which contacts by means of conductor 243 serve as a negative return from the power relays 60a and 60b.

The switch unit 244 of master switch 225 is provided with a pair of separate switch arms 245 and 248, the arm 245 being connected to the conductor 57a of the cam selector device 52 and adapted in the "remote" position to engage a contact 247, which in turn is connected by means of conductor 209 with the back contact 208 of radio relay 204a, and in the "local" position to engage a contact 246, which is electrically connected to switch contact 184a, of local control switch 182.

*Operation*

Assume master switch 225 to be placed in the "remote" control position and assume a radio audio frequency control signal has operated relay 204c, to order a "hard right" turn of the boat. Current will be supplied to the radio power supply from conductors 229 and 262 and armature conductor 46 of motor 38 will be adapted to receive current from conductor 231. Upon radio relay 204c being closed, current will flow from conductor 233 through relay arm 205 of radio relay 204d, contacts 206 and 208 associated therewith, relay arm 205, of relay 204c, contacts 206 and 207 associated therewith, to conductor 57d and contact 54 of cam selector unit 52 associated with cam $C_{13}$. Contact 54 will be in engagement with the associated contact 55 or 56 if the rudder is not in the "hard right" position and current will then flow through the coil of relay 60a or 60b to negative return lead 243, contact 242 and switch blade 241 of master switch unit 240, and by conductor 262, to the negative terminal of battery 260. Relay 60a or 60b upon being energized, closes a circuit through its contacts and allows current to flow from the positive terminal of battery 260, through switch blade 227, contact strip 230, conductor 231, armature lead 46, and one of the motor field leads 47 or 48, to the negative return lead 243 of the power relays, causing motor 38 to be energized to move the rudder to the "hard right" position. As motor 38 is positioning the rudder, the push-pull control 50 is causing rotation of the shaft 53 and the cam assembly mounted thereon, so that when the rudder reaches the desired position cam $C_{13}$ has broken the circuit between contacts 54 and 55 or 56 associated therewith, causing the operative relay to be deenergized and opening the power circuit through motor 38, stopping the motor and leaving the rudder in the selected adjusted position.

Radio relays 204a, 204b and 204d are each respectively operative in a similar manner to control the positioning of the rudder in "cruise right," "cruise left" and "hard left" positions.

When under remote control, if no rudder control audio frequency command signal is present, all of the relay arms 205 will be in engagement with the back contacts 208, allowing current to flow from positive conductor 233 directly through to conductor 209. Current will then flow from conductor 209 to contact point 247 and switch arm 245 of switch 244 and through conductor 57a to the contact 54 associated with cam $C_{10}$, causing rudder motor 38 to position the rudder in the "straight" ahead position in the same manner as above described with reference to cam $C_{13}$ and the "hard right" position. By employing the series connected arrangement of the radio relays, the use of a separate relay and filter circuit for controlling the positioning of the rudder in the "straight" position is avoided.

When the master switch 225 is rotated to the "local" position, the blade 227 of master switch unit 226 will pass out of engagement with the contact 232 deenergizing conductor 233 and electrically disabling the current flow to the radio relays, while current will now flow to contact 234, conductor 235 and to the rotary switch arm 183, of the local control switch 182. By moving switch arm 183 into engagement with either of switch points 184b, 184c, 184d or 184e, conductors 57b, 57c, 57d or 57e will respectively become energized to cause the positioning of the rudder in the same respective position, as if any one of relays 204a to 204d inclusive were energized. If the switch arm 183 is positioned in engagement with switch point 184a, current will then flow to switch contact 246 and switch arm 245 of master switch unit 244, the conductor 57a will then be energized to cause the rudder to be positioned in the "straight" ahead position. It is thus seen that by actuation of local control switch 182, the rudder motor control system may be tested for operativeness exclusive of the radio control relays, although it will be noted that in the local setting of master switch 225, power will be supplied to the radio power supply unit from positive conductor 229 associated with the contact 228 of master switch unit 226 and through the negative battery lead 262, permitting the radio control system to be tested independent of the rudder control system.

In the "manual" position of master switch 225, conductors 231, 233 and 235 associated with master switch unit 226, branch conductor 262 and conductor 243, associated with master switch unit 240, will be electrically dead and switch arm 245 of master switch unit 244 will be out of engagement with either of contacts 246 or 247, rendering the rudder electrical control system inoperative. In the "manual" position power will still be supplied to the radio power supply unit for testing purposes and current will be supplied to contact 236 of master switch unit 226, which will supply current to conductor 237, for actuation of the clutch control by means of the push button control unit 15 (Figure 1) as previously noted. The boat can then be manually controlled in the manner previously described.

When the master switch is set in the "off" position, switch arm 227 of master switch unit 226 is out of engagement with any contact and the entire electrical system including the radio power supply unit 201 (Figure 1) is electrically dead.

Engine throttle and clutch control

Referring now to the diagrammatic showing of the engine throttle and clutch control circuits in Figure 7, it is seen that the filter circuit and relay unit 204 of the radio control unit 200 (Figure 1) is provided with three radio relays 204e, 204f and 204g, in addition to and of the same construction as the radio relays above described with reference to Figure 6. All of the relay arms 205 are connected in series when in contact with their associated back contacts 208 and serve to transmit power from conductor 233 connected to the relay arm 205 associated with relay 204g, to the conductor 210, which is connected to the back contact 208 of radio relay 204e. Due to the series connection any one of the relay arms may receive current from conductor 233 through the preceding relay arms 205 and back contacts 208. The front contact 207 of radio relay 204e, is connected by a conductor 211 to a switch arm 254 of a selector switch 252 and the front contact 207 of relay 204f is similarly connected by means of a conductor 212, to the switch arm 253 of the selector switch 252. The switch arms 253 and 254 are rotatable together by a common means. The switch arm 253 is adapted to engage a contact 255, electrically connected to the contact 144 associated with cam $C_2$ of the throttle engine 115, or to engage a contact 256 electrically connected to the contact 144 associated with cam $C_3$ of the throttle engine. The switch arm 254 of the switch 252 is adapted to engage either of contacts 257 or 258, respectively electrically connected to the contacts 144, associated with the throttle engine cams $C_5$ and $C_4$ respectively.

The front contact 207 associated with the relay 204g is connected by means of the conductor 213, directly to the contact 144, associated with cam $C_1$ of throttle engine 115. The conductor 210 above noted is connected to a switch point 249 of the master switch unit 244 and is adapted to be engaged by the switch arm 248, which is connected by a conductor 214 to the contact 144 associated with cam $C_6$ of the throttle engine unit 115. The switch arm 248 is also adapted when in the "local" control position, to engage the switch contact 25 which is electrically connected to the contact point 186a, of the local control switch 184. The local control switch 184 has a switch arm 185 adapted to receive current from conductor 235, which is electrically connected to the contact point 234 of master switch unit 226. The switch arm 185 is adapted to contact any one of the switch points 186a to 186d inclusive, the switch points 186b to 186d inclusive being respectively connected to the conductors 213, 212 and 211.

The contacts 146 associated with cams $C_1$ to $C_6$ inclusive of throttle engine 115 are connected in parallel to one side of the coil of a power relay 60d and similarly the front contacts 145 are connected to one side of the coil of power relay 60c, the other terminals of the relay coils being connected to the negative return conductor 243. Thus upon any contact 144 being energized and in engagement with either of the associated contacts 145 or 146 relay 60c or 60d will close. The relay contacts, when closed, serve to connect the field conductors 189 and 190 of the motor 125 respectively to the negative return conductor 243 to cause the motor to run in the forward or reverse direction. Power is supplied to the armature of the motor 125 by conductor 231, which is electrically connected to the contact 234 of master switch unit 226.

The vacuum clutch actuating servo motor 5, as seen in Figure 7, is provided with a solenoid controlled valve 6, operative to cause the servo motor piston to move to the forward position for engaging the forward drive clutch unit of the transmission 2 of Figure 1, and a solenoid controlled valve 7, operative to cause the servo motor piston to move to the reverse position for reversing the transmission drive. Each of the solenoid coils of the valve controls 6 and 7 are connected in parallel to a branch of the negative battery conductor 262. The other terminals of the solenoid coils of valves 6 and 7 are respectively connected to the conductors 11 and 12, which in turn are respectively adapted to be connected to a power supply lead 237, by means of push button switches indicated by the reference characters F and R, of the manually controlled switch 15. The clutch servo motor is also provided with a snap switch 8 having a switch arm cooperating with contacts respectively connected to the conductors 11 and 12. The switch 8 is connected to power lead 237 by a conductor 13, having the push button switch S of the manual control switch unit 15 associated therewith. The conductor 237 is connected to a contact 236 of master switch unit 226 and is energized upon setting the master switch to the "manual" setting position. Switch 8 is actuated by the piston of the servo motor 5 and is operative when energized to cause the servo motor piston to move in opposite directions from either extreme position and to be opened when the piston reaches the mid point of its travel, thereby stopping the piston in the neutral position. The front and rear contacts 145 and 146 associated with the clutch control cam $C_7$ of throttle engine 115 are respectively connected by leads 192 and 193 to the conductors 11 and 13 respectively. The contact 144 associated with the cam $C_7$ is electrically connected to the current conductor 231, which is adapted to be energized from contact strip 230 of master switch unit 222, whenever the latter is in the "remote" or "local" positions. The clutch control cam $C_7$ of throttle engine 115 is thus capable of automatically controlling the clutch servomotor in the forward and stop positions in cooperation with the cam $C_6$, as previously described with reference to Figures 2 to 5 inclusive.

Assuming master switch 225 to be placed in the "remote" position, power will be supplied to the radio power supply through leads 229 and 262 as previously noted and power supply conductors 231 and 233 will be energized through master switch unit 226 and the negative return conductor from power relays 60c and 60d will be connected to the negative battery lead 262 through master switch unit 240. The switch arm 248 of master switch unit 244 will be in contact with contact 249, electrically connecting conductor 210 with conductor 214 and the contact 144 associated with cam $C_6$ of throttle engine 115, which as previously noted controls the "idle" setting of engine throttle control arm 103. If selector switch 252 is assumed to be in the position B (battleship) as illustrated in Figure 7, conductor 211 will be in electrical connection with the contact 144 associated with cam $C_4$ of the throttle engine through selector switch arm 254 and switch contact 258, likewise conductor 212 will be electrically connected through selector switch arm 253 and switch contact 255 with the contact 144 associated with throttle engine cam $C_2$. If radio relay 204e is now energized by a radio signal, current will flow from conductor 233 to the relay arm 205, contact 206 and the contact 207 associated with the relay, allowing current to flow to conductor 211 and contact 144 associated with cam $C_4$, as above noted. Current will flow from the contact 144 to either of contacts 145 or 146, to actuate a respective relay 60c or 60d, to energize motor 125 to run in a direction to set the engine throttle at a high speed corresponding to a boat speed of eighteen miles per hour. As soon as the engine throttle arrives in the desired position, the cam $C_4$ opens the circuit through the operative power relay coil thus deenergizing motor 125 in the manner previously described with reference to Figures 2 to 4 inclusive. As long as the radio signal persists, relay 204e will remain closed and the throttle will remain in the adjusted position. If now radio relay 204f becomes energized, the throttle engine through the action of cam $C_2$ will position the throttle in a cruising position, corresponding to some fraction of the battleship high speed. If the selector switch 252 was set in the C (cruiser) position, cam $C_5$ would cooperate with radio relay 204e to cause the engine throttle to be positioned to give a high speed of approximately 35 miles per hour and similarly cam $C_3$ would cooperate with radio relay 204f to position the engine throttle for a cruising speed of a desired fraction of the cruiser high speed. Radio relay 204g is operative in a similar manner through conductor 213 and contact 144 associated with cam $C_1$, to cause motor 125 to position the engine throttle in the "slow" position.

If no radio command signal is present, all of the relays will be in the open position completing a circuit from conductor 233 to conductor 210, which through master switch unit 244, conductor 214 and the contact 144 associated with cam $C_6$, is operative to cause motor 125 to position the engine throttle in the "idle" position, simultaneously causing cam $C_7$ to control the clutch servo motor 5, to declutch the engine from the propeller shaft of the boat in the manner previously described.

When master switch 225 is placed in the "Local" control position, the switch unit 226 will disconnect conductor 233 from battery 260 and will now energize conductor 235 from contact 234 and the switch arm 248 of master switch 244 will engage contact to thereby electrically connect conductor 214 with the contact point 186a of local control switch 184. By moving the switch arm 185 of the local control switch into engagement with contact 186a, throttle engine 115 will position the engine throttle in the "idle" position with simultaneous disengagement of the clutch, by engaging contact 186b, the throttle will be positioned in the "slow" ahead position and the clutch will be engaged for forward drive as previously noted and similarly by engaging contacts 186c or 186d in cooperation with the manual setting of selector switch 252 two cruising and two high speed settings of the throttle may be obtained. It is seen that the local switch 184 permits all of the components of the throttle and clutch control systems to be actuated through all of the predetermined positions, possible with the radio control of these components.

In the "manual" control position of the master switch 225, all of the automatic throttle and clutch control units are rendered inoperative, while conductor 237 will be energized to permit push button control of the clutch servomotor. In the "manual" position the engine throttle may be manually controlled in the manner previously described, the various throttle control cams $C_1$, $C_2$, etc., following the movement of the manual control so as to always be positioned to properly control the power positioning of the throttle in any one of the plurality of predetermined positions.

When the master switch 225 is set in the "off" position, all of the throttle and clutch control units are rendered electrically dead.

In the radio control system as actually built and installed in a target boat, all of the various units are housed in watertight casings, all electrical wiring being enclosed in watertight conduits with external electrical connections being made to the units within the watertight housings through multiprong plug connectors. The target boat is provided with flotation tanks so that when actual explosive bombs are used in target practice, and one or more of which make direct hits or otherwise damage the boat, the boat will remain afloat and the watertight housings will protect the delicate and expensive control equipment and permit the undamaged apparatus to be salvaged.

Figure 8:
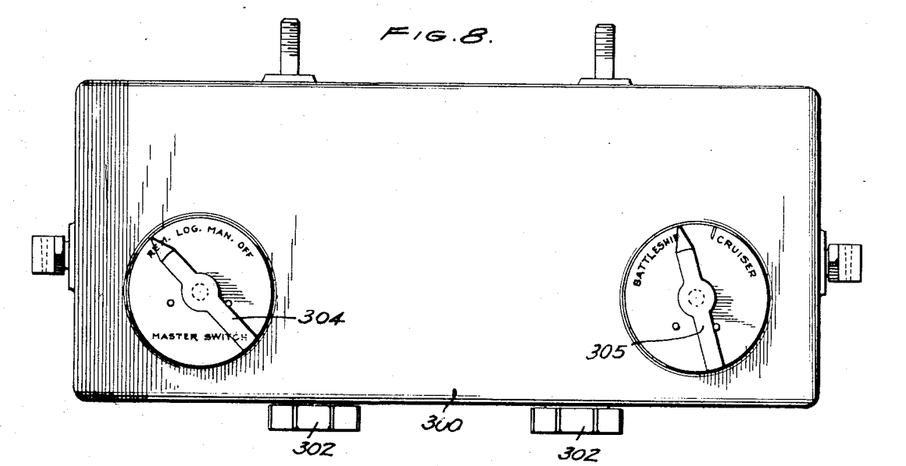
Figure 8 is a top plan view of a watertight housing employed to enclose certain of the apparatus disclosed in Figure 1.
Figure 9:
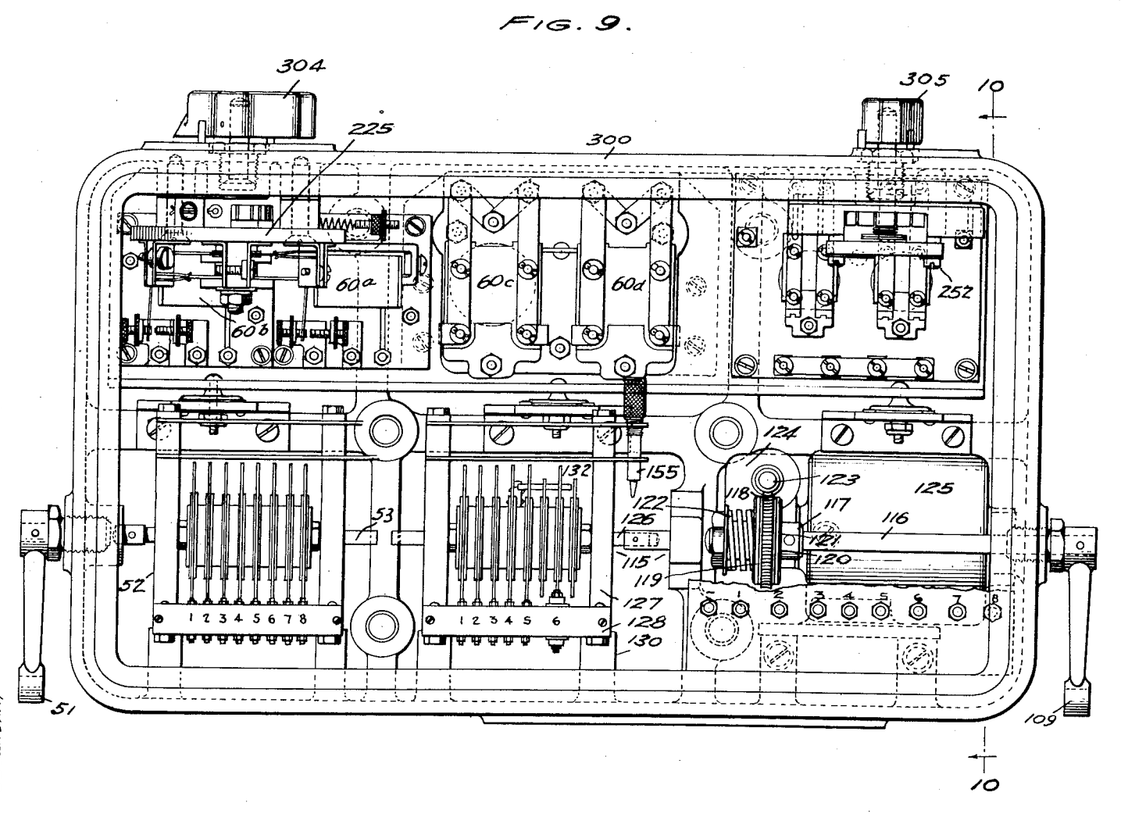
Figure 9 is a front elevation view of the housing of Figure 8 with the cover removed and illustrating the arrangement of apparatus within the housing.
Figure 10:
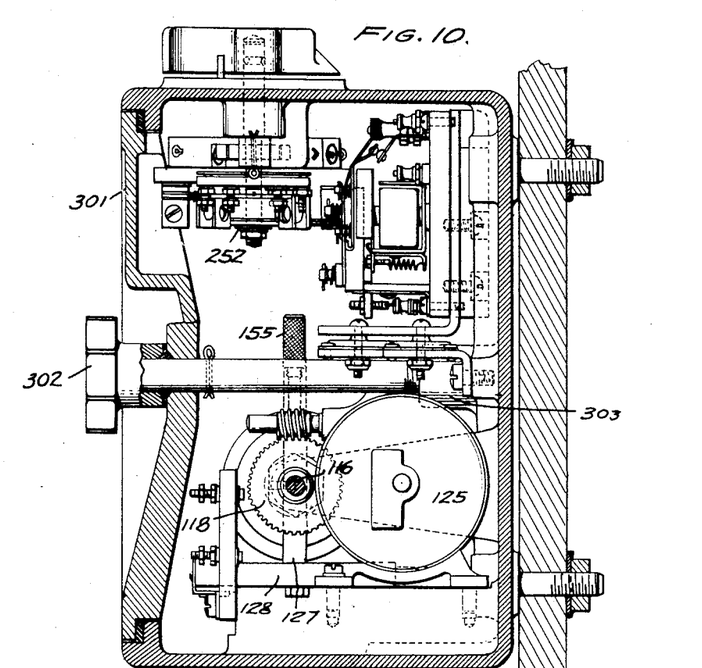
Figure 10 is a sectional view taken on line 10—10 of Figure 9 with certain of the parts shown in section.

Figures 8, 9 and 10 illustrate the housing indicated by reference numeral 300 in Figure 1, which views also illustrate the actual arrangement of the rudder selector cam device 52, the throttle engine 115 and the power relays of the relay unit 60 (Figure 1) arranged in the watertight housing, the parts previously described having the same reference numerals in Figures 1 to 7 inclusive.

As seen in Figures 8, 9 and 10, the master switch 225 is controlled by a knob 304 and the selector switch 252 is controlled by a knob 305, each of the knobs being mounted on shafts extending through the upper wall of the housing 300 through suitable packing glands, the switches 225 and 252 being of a known type of multibank contact rotary switch. The housing 300 is made of metal and formed as a deep rectangular box, the bottom of which is formed with suitable raised lugs to which the mounting bases of the various units are secured. The open end of the housing 300 is adapted to be closed by a removable cover 301 held in sealing relation with the housing by a suitable rubber gasket. The cover 301 is secured by means of screws 302 which screw into threaded lugs 303 formed on the back of the housing. The screws are readily removable permitting the housing to be quickly opened for inspection and adjustment of the devices inclosed therein.

The shaft 53 of the rudder selector cam unit 52 and the throttle engine power actuating shaft 116, project through opposite ends of the casing 300, through suitable packing glands. A multiplug socket (not shown) serves to connect the internal wiring to external electrical conductors. The casing 300 with its associated devices may be submerged in salt water for a considerable period of time without damage to the various control units enclosed therein. It will be noted that Figure 9 illustrates the rudder cam selector unit 52 as having eight cams, but only five of these are employed to obtain the five predetermined rudder positions described above and similarly only six cams are shown in Figure 9 associated with the throttle engine unit 115, but this is due to the fact that the switch 252 is not employed to select alternative cruising speeds, as illustrated in Figure 7.

While the use of audio frequency control signals has been described as the preferred means for accomplishing the radio control, other systems such as those employing coded impulses may be used to cause actuation of the various radio relays.

While a single embodiment of the invention has been illustrated and described other modifications will become apparent to those skilled in the art as falling within the scope of the invention as defined by the appended claims.

We claim:

1. In combination, an engine throttle control means, a shaft for actuating said control means, a servomotor, a slippable drive connecting said servomotor and said shaft, means for energizing said servomotor to position said shaft in any one of a plurality of predetermined positions, follow-up means including a plurality of cams connected to said shaft and each operative to discontinue the supply of energy to said servomotor in a respective selected predetermined position of said engine throttle control means and manual means connected to said shaft and operable through said slippable drive to position said engine throttle control means in any desired position.

2. A driving system for vehicles including, an engine, vehicle propelling means, power actuated means for connecting or disconnecting the engine from said propelling means, control means for said power actuated means, engine speed controlling means, a servomotor for actuating said engine speed controlling means, radio signal responsive means including a plurality of relays each selectively operative to energize said servomotor, a follow-up device associated with each respective relay and operative to deenergize said servomotor at a predetermined position of said engine speed controlling means and means positioned by said servomotor for causing said power actuated means to connect said engine to said vehicle propelling means in one of the predetermined positions of said engine speed controlling means and to disconnect the engine from said vehicle propelling means in another of said predetermined positions of said engine speed controlling means.

3. In a remote control system for vehicles, an engine, vehicle propelling means, power actuated means for selectively connecting or disconnecting the engine from said vehicle propelling means, engine speed controlling means, means connecting said power actuated means to said engine speed controlling means for controlling said power actuated means, radio signal responsive means for selectively positioning said engine speed controlling means in certain predetermined positions in response to predetermined radio signals, said radio signal responsive means being effective in the absence of a radio control signal to position said engine speed controlling means in a further predetermined position causing said power actuated means to disconnect the engine from said vehicle propelling means.

4. In a remote control system for vehicles, a vehicle directional control means, power means for actuating said control means, radio signal responsive means for selectively controlling said power means to position said vehicle directional control means in any one of certain predetermined positions in response to predetermined radio signals, said radio signal responsive means being further operative in the absence of any radio control signal to control said power means to position said directional control means in a further predetermined position.

5. In a remote control system for vehicles, an engine, means to control the speed of said engine, a vehicle directional control means, a radio signal responsive means adapted to selectively position said engine speed controlling means and said vehicle directional control in certain predetermined positions responsive to predetermined respective speed control and directional control radio signals, said radio signal responsive means being effective upon cessation of radio speed control signals to position said engine speed control in a further predetermined position and effective upon cessation of directional radio control signals to position said directional control means in a further predetermined position without interference with the remote engine speed control, and upon cessation of all radio control signals to simultaneously position said engine speed control means and said vehicle directional control in the said further predetermined positions.

6. In a remote control system for boats and the like, an engine speed controlling element, a directional steering element, separate servomotors associated with each of said elements to actuate the same, radio signal responsive means for controlling each of said servomotors to selectively position each of said control elements, a local testing control means connected in parallel with said radio signal responsive means for selectively controlling each of said servomotors to respectively position said control elements, manual control means associated with each of said control elements and a switch means operable to render either said radio signal responsive means or said local testing control means operative or to render both simultaneously inoperative to thereby permit the use of each of said manual control means.

7. In combination, a control element, an electric motor for positioning said control element, a plurality of power circuits connected to said electric motor, radio signal responsive means including a plurality of relays each responsive to a predetermined radio control signal and operative to energize a respective one of certain of said power circuits, follow-up means actuated by said control element respectively associated with each relay and operative to open said one power circuit upon said control element attaining a predetermined position and said relays being jointly operative to energize a further one of said power circuits to cause said electric motor to position said control element in a further predetermined position.

8. In a remote control system for boats and the like, an engine speed controlling element, a directional steering element, separate servomotors associated with each of said elements to actuate the same, radio signal responsive means for controlling each of said servomotors to selectively position each of said control elements, a local testing control means connected in parallel with said radio signal responsive means for selectively controlling each of said servomotors to respectively position said control elements, and switch means operable to render either said radio signal responsive means or said local testing control means operative or to render both simultaneously inoperative.

9. In a control system for vehicles and the like, an engine, a vehicle driving means, power actuated means for connecting said engine to said vehicle propelling means for forward or reverse vehicle drive or to disconnect the engine from the vehicle drive means, an engine speed controlling element including a servomotor for positioning said element, radio signal responsive means for controlling said servomotor to position said engine speed control in selected predetermined positions and switch means actuated by said servomotor for controlling said power actuated means to disconnect said engine from said vehicle drive means in one of said predetermined positions of said speed control means and operative to cause said power actuated means to connect said engine to said vehicle drive means for forward drive in another of the predetermined positions of said speed control means.

10. The structure as claimed in claim 9, including a manually operated switch means for selectively controlling said power actuated means to obtain any one of said three named driving conditions and selector switch means for selectively rendering either said radio signal responsive means or said manually controlled switch means effective to control the actuation of said power actuated means.

11. In combination, an engine, a throttle actuating device for controlling the speed of said engine, a stop for limiting the low speed setting of said throttle actuating device, a servomotor, a resilient linkage connecting said servomotor and said throttle actuating device, control means for causing said servomotor to position said throttle actuating device, a clutch for connecting said engine to a propelling shaft, a servomotor for actuating said clutch, and switch means actuated by said first named servomotor for causing said clutch actuating servomotor to actuate the clutch to disconnect said engine from driving relation with said shaft, said switch being closed after said throttle actuating device engages said limiting stop.

12. The structure as claimed in claim 11 in which the control means for said throttle actuating servomotor includes a plurality of radio signal responsive means each effective to cause said first named servomotor to be positioned in a certain predetermined position and effective in the absence of a radio control signal to cause said throttle actuating servomotor to position said throttle actuating device in said limiting position and thereafter to actuate said switch means.

13. In a control system, a control element, a servomotor operative to position said control element including a slippable drive, control means for selectively energizing said servomotor, follow-up means positioned in accordance with the position of said control element to deenergize said servomotor in predetermined positions of said control element and manual means for actuating said control element and said follow-up means independent of said servomotor.

14. In a remote control system for a dirigible craft, directional control means including a control member, speed control means including a control member, separate power operated servomotors, each connected to a respective one of said control members, each of said servomotors having associated therewith a plurality of radio signal responsive relays each operative to energize the associated servomotor in response to predetermined radio signals to cause the control member to be positioned in one of a plurality of predetermined positions, follow-up means associated with each relay and operatively connected to the associated control member for deenergizing the associated servomotor upon the control member attaining the selected position, and local test control means connected in parallel with said relays for selectively energizing the servomotors to position the control members in any of the said predetermined positions independent of the relays.

15. In a remote control device, a control element, an electric motor operative to position said control element, a slippable connection between said motor and said element, a plurality of radio signal responsive relays each effective to energize said motor in response to a predetermined radio signal, a selector means associated with each relay, a connection between said control member and each selector means operative to cause said selector means to de-energize said motor upon said control member attaining a corresponding predetermined position; and manual means connected to said control element and operative to position the same in any desired position irrespective of said servomotor.

GEORGE V. HOLLOMAN.
CHARLES L. PAULUS.
RAYMOND K. STOUT.